United States Patent Office 3,202,622
Patented Aug. 24, 1965

3,202,622
VINYL HALIDE RESIN STABILIZERS COMPRISING HYDROLYZED MIXTURES OF METAL PHENATES, METAL SALTS OF MONOCARBOXYLIC ACIDS AND ORGANIC PHOSPHITES
James P. Scullin, Pompton Lakes, and Theodore A. Girard, Wayne Township, Passaic County, N.J., assignors, by mesne assignments, to Tenneco Chemicals, Inc., a corporation of Delaware
No Drawing. Filed Aug. 28, 1961, Ser. No. 134,082
10 Claims. (Cl. 260—23)

This invention relates to compositions useful as stabilizers for halogen-containing resins and to the resinous compositions stabilized therewith.

A rapidly expanding industry utilizing vinyl halide resins has created a need for stabilizers that will render the finished articles of manufacture more useful, more versatile in application, and more nearly permanent. During their fabrication into plastic sheets, rigid bodies, and the like, for example, vinyl halide resins are ordinarily subjected to elevated temperatures. The resins so treated tend to decompose somewhat as is evidenced by their development of color. This decomposition is especially pronounced when scrap portions of the resins are reprocessed in apparatus operated at elevated temperatures. Even though the decomposition on heating may not detract to any appreciable extent from the physical properties of the resins, the discoloration seriously restricts their use in many applications. There has therefore arisen a need for stabilized vinyl halide resin compositions that can withstand without darkening or otherwise deteriorating the heating to which they may be subjected during processing as well as the subsequent prolonged heating of the finished products.

In addition to having good heat stability, it is necessary that vinyl halide resin compositions show little or no tendency to plate-out during processing. Plate-out is the result of the separation of one or more ingredients, usually pigments and stabilizers, from a vinyl halide resin composition during the various stages of its processing and the deposition of these materials onto the metal surfaces of the processing equipment. When plate-out occurs, uneven deposits may be built up which eventually destroy the smooth surfaces of rolls and molds. These deposits on the metal surfaces may cause streaking or spotting of the finished product. They may also interfere with sheet transfer from roll to roll or with the removal of the product from the mold, thereby reducing the rate of production. In addition plate-out makes necessary expensive and time-consuming cleaning operations whenever different colored compositions are to be run consecutively in a piece of equipment.

In addition to heat stability and resistance to plate-out, the compositions should have good color, clarity, and light stability.

A number of compounds and combinations of compounds have been suggested for use as stabilizers in vinyl halide resin composition. While some of these impart heat stability to the resins and others reduce their tendency to plate-out, none have been disclosed that provide the desired combination of heat and light stability and resistance to plate-out.

It is known that mixtures comprising a polyvalent metal phenate, a polyvalent metal salt of monocarboxylic acid, and an organic phosphite can be used to stabilize vinyl halide resin compositions. While the properties of the vinyl halide resin compositions that contain these mixtures are largely dependent upon the choice of the stabilizing components and the amount of each that is present, these compositions are generally characterized by good color, color retention, and clarity, by excellent heat and light stability, and by poor to fair resistance to plate out.

We have now discovered a procedure by means of which the plate-out resistance of these metal phenate-metal salt-organic phosphite stabilizers can be substantially improved. Through the use of this procedure it is possible to obtain stabilizers that can be used to form vinyl halide resin compositions that have excellent heat and light stability and that have little or no tendency to plate out. In addition the compositions containing the novel stabilizers are characterized by light colors, by good color retention, and by unusual clarity.

In addition to improving the properties of the stabilized vinyl halide resin compostions, the process of the present invention also has a beneficial effect on the physical characteristics of the stabilizer mixture. The three-component stabilizer mixtures that have been described in the art are often non-uniform mixtures which may form agglomerates and precipitates on storage for short periods at room temperature. The stabilizers of the present invention on the other hand are homogeneous products that are stable even on prolonged storage at elevated temperatures.

It has now been found that the properties of the metal phenate-metal salt-organic phosphite stabilizers and those of vinyl halide resin compositions that contain these stabilizers can be improved substantially by treating the mixture of stabilizing components at an elevated temperature with a small amount of water. These improvements in the physical properties of the stabilizer mixture and in the plate-out resistance of the stabilized compositions are brought about without adversely affecting the color, clarity, and heat and light stability of the resinous compositions.

The process of the present invention can be applied to any of the aforementioned metal phenate-metal salt-organic phosphite stabilizers to improve their properties. It is to be understood, however, that these stabilizers vary considerably in their heat- and light-stabilizing ability and other characteristics and that the properties of the compositions containing the novel stabilizers, while superior in every case to those of compositions containing the untreated stabilizers, will also vary within wide limits.

In the practice of the process of the present invention, an alkali metal phenate is first mixed with a polyvalent metal salt of a monocarboxylic acid, an organic phosphite, a solvent, and if desired certain additive. This mixture is then heated to a temperature between approximately 110° F. and 190° F. and preferably between 150° F. and 160° F. and maintained at that temperature while a small amount of water is gradually added to it. The amount of water that is added to the mixture of stabilizer components is ordinarily in the range of approximately 0.1% to 5.0% and preferably approximately 0.2% to 1.0%, based on the total weight of the stabilizer. The use of less than approximately 0.1% of water usually does not bring about the desired improvement in the properties of the stabilizer. Larger amounts of water than those specified are usually not used since they may have a deleterious effect on the stability of the resulting stabilizer mixture. The water is added gradually to the mixture of stabilizer components, usually over a period of about one to two hours, while the mixture is maintained at a temperature in the specified range. The treated mixture is then cooled and filtered.

The reaction that takes place during the treatment of the mixture of stabilizer components with water is not now fully understood. While it is known that organic phosphites are hydrolyzed readily by treatment with water, the overall reaction that takes place during the treatment of the stabilizer mixture clearly involves more than just the hydrolysis of the organic phosphite component. To demonstrate this, a series of mixtures was prepared which contained in addition to an alkali metal phenate and a polyvalent metal salt, a dialkyl phosphite, a diaryl phosphite, or a monoalkyl monoaryl phosphite. These mixtures were incorporated into vinyl halide resin compositions which were then evaluated by standard methods. Each of these compositions had good plate-out characteristics, but they deteriorated rapidly on exposure to heat and to light. In view of these observations, the present invention is not to be construed as being limited to any particular mechanism of reaction.

The polyvalent metal phenate component of the mixture that is treated with water to form the novel stabilizers is an alkaline earth metal salt of an alkyl-substituted phenol. The alkyl-substituted phenols that may be used in the preparation of the phenates are those having as substituent one or more straight-chain or branched-chain alkyl groups each of which contains from 4 to 12 carbon atoms. Illustrative of these alkyl phenols are n-butylphenol, tert. butylphenol, n-octylphenol, tert. octylphenol, n-dodecylphenol, dibutylphenol, and dinonylphenol. The alkaline earth metals that may be used to form the phenates are barium, strontium, and calcium. A single metal or a mixture of these metals may be used. The preferred phenates are the barioum alkylphenates prepared from alkylphenols in which the alkyl group contains from 8 to 10 carbon atoms, that is, barium octylphenate, barium nonylphenate, and barium decylphenate.

The second component of the stabilizer mixture is a polyvalent metal salt of a monocarboxylic acid. The monocarboxylic acids from which the salts are prepared include both aliphatic acids and benzenoid acids. The aliphatic acids are fatty acids that contain from 2 to 22 carbon atoms and preferably from 6 to 12 carbon atoms. They may be straight-chain or branched-chain acids. Illustrative of the preferred fatty acids are caproic acid, 2-ethyl-hexanoic acid, caprylic acid, pelargonic acid, capric acid, and lauric acid. The benzenoid monocarboxylic acids are benzoic acid and substituted benzoic acids, the preferred substituted benzoic acids being toluic acids, tert. butylbenzoic acids, chlorobenzoic acids, cresotinic acids, anisic acid, salicylic acid, and p-hydroxy-benzoic acid. A single acid or a mixture of monocarboxylic acids may be used. The useful polyvalent metal salts include salts of cadmium, zinc, tin, zirconium, calcium, and mixtures thereof, the preferred salts being cadmium salts and mixtures of cadmium and zinc salts.

The organic phosphites that may be used in the stabilizer mixtures include a wide variety of substituted and unsubstituted aliphatic and aromatic phosphites. Among these phosphites are trialkyl phosphites, triaryl phosphites, and alkyl aryl phosphites. Also useful are phosphites derived from pentaerythritol and other neopentyl polyhydric alcohols. These phosphites are described more fully in copending application Serial No. 753,423, which was filed by Theodore A. Girard on August 6, 1958, now abandoned. The preferred phosphites are the alkyl aryl phosphites and the triaryl phosphites in which the alkyl groups are straight-chain or branched-chain groups containing from 2 to 18 and preferably from 4 to 10 carbon atoms and the aryl groups are phenyl groups or substituted phenyl groups in which the substituents are hydroxyl groups, halogen atoms, or alkyl groups containing from 1 to 12 carbon atoms. Illustrative of the preferred organic phosphites are the following: triphenyl phosphite, tri (p-tert-butylphenyl) phosphite, diphenyl monobutyl phosphite, diphenyl mono-n-decyl phosphite, monophenyl dioctyl phosphite, monophenyl di-2-ethylbutyl phosphite, di-p-tert. octylphenyl mono-2-ethylhexyl phosphite, di-(nonylphenyl)-mono-2-chloroethyl phosphite, and monochlorophenyl di (β-chloropropyl) phosphite.

As used herein, the terms "part" or "parts" and "percent" indicate parts by weight or percent by weight, unless otherwise specified.

To form products having the desired combination of heat and light stability, resistance to plate-out, and other properties, the vinyl halide resin composition should contain approximately 0.03 to 0.5 part of alkaline earth metal as the alkylphenate, 0.02 to 0.3 part of polyvalent metal as the salt of a monocarboxylic acid, and 0.01 to 0.2 part of phosphorus as the organic phosphite per 100 parts of the vinyl halide resin. Optimum results are obtained when 0.1 to 0.2 part of barium, 0.08 to 0.15 part of cadmium, and 0.03 to 0.1 part of phosphorus are present per 100 parts of the resin. When less than the specified amounts of the metals are used, the compositions do not have the required combination of properties. When amounts substantially larger than those specified are used, there is not a corresponding improvement in properties to compensate for the extra cost of the stabilizer used. Since the metals are added as metallo-organic compounds, it is to be understood that the actual weights of the stabilizing compounds used are largely dependent upon the molecular weights of the organic portions of the compounds and that in each case amounts of the compounds are used that will provide the aforementioned amounts of the metals.

The stabilizers of the present invention are generally prepared by forming a mixture containing the barium alkylphenate, cadmium salt, organic phosphite, solvent, and additives if any and then treating this mixture with water by the procedure of the present invention. This mixture preferably contains 5–7% of barium as a barium alkylphenate, 3–5% of cadmium as a cadmium salt, and 1–3% of phosphorus as an organic phosphite. When it is to be used in resin compositions in which it is advantageous to include a zinc compound, the stabilizer mixture may also contain 0.5%–2% of zinc as the zinc salt of a monocarboxylic acid. In such cases the total amount of cadmium and zinc that is present is between approximately 3.5% and 5.0%.

Approximately 0.5 to 10 parts and preferably 1 to 4 parts of the stabilizer mixture is used per 100 parts of the vinyl halide resin to form compositions containing the aforementioned amounts of the metals.

The solvent that is used in combination with the stabilizing components is usually an aliphatic or aromatic hydrocarbon, for example, benzene, toluene, xylene, mineral spirits, kerosene, and naphtha.

In addition to the aforementioned metallo-organic compounds and the solvent, the stabilizer mixture may contain such additives as antioxidants, peptizing agents, viscosity controlling agents, and the like. For example, they may contain as peptizing agent from approximately 2% to 20% and preferably 5% to 10% of a glycol, such as diethylene glycol, triethylene glycol, tripropylene glycol, and mixtures thereof.

The stabilized vinyl halide resin compositions are conveniently prepared by mixing together the vinyl halide resin, the stabilizer, a plasticizer, and other ingredients, if any, with or without the aid of a volatile solvent, and milling the resulting mixture on rolls at 200° F. to 350° F. until it is homogeneous. The stabilized resin may then be removed from the mill in the form of a sheet or film of the desired thickness which may be used as such or subjected to a polishing or embossing treatment. Alternatively, the stabilizer may be incorporated by dissolving it in a solution of the resin and subsequently recovering the stabilized resin.

The halogen-containing resins which are rendered heat and light stable and plate-out resistant by the addition of the novel stabilizers are the resinous products obtained by the polymerization of a vinyl halide in the presence or the absence of another polymerizable compound. The term "vinyl halide resin" as used herein includes vinyl halide homopolymers, such as polyvinyl chloride, polyvinyl bromide, and polyvinylidene chloride, as well as copolymers, such as those formed by the polymerization of a mixture of a vinyl halide with at least one other polymerizable mono-olefin, such as vinyl acetate, vinyl propionate, vinyl butyrate, vinylidene chloride, styrene, methyl methacrylate, dialkyl fumarate or maleate, and the like. The vinyl halide used is ordinarily and preferably the chloride, but the bromide, and fluoride may also be used. The copolymers useful in the practice of this invention are those prepared from at least 70% of a vinyl halide and up to 30% of the other polymerizable mono-olefinic compound.

Any of the usual plasticizers for vinyl halide resins may be used in the stabilized compositions of the present invention. These include, for example, dioctyl phthalate, dibutyl sebacate, tricresyl phosphate, and the like. The plasticizer is generally present in the amount of about 5 to 100 parts per 100 parts of the resin. Other heat and light stabilizers as well as pigments, fillers, extenders, solvents, and the like may also be used in the preparation of the stabilized resinous compositions.

The preparation of the novel stabilizers and their use in vinyl halide resin compositions are illustrated by the examples that follow. It is to be understood, however, that these examples are given solely for the purpose of illustration and that the invention is not to be regarded as being limited to any of the specific materials or conditions recited therein except as set forth in the appended claims.

EXAMPLE 1

A stabilizer mixture that contained 5% of barium, 3% of cadmium, and 2.5% of phosphorus was prepared by mixing together 13.1 parts of barium nonylphenate, 3.5 parts of cadmium benzoate, 3.5 parts of cadmium p-tert. butylbenzoate, 30 parts of diphenyl n-decyl phosphite, 6 parts of tripropylene glycol, and 43.9 parts of naphtha.

This mixture was heated to 150°–160° F. and maintained at that temperature for 90 minutes during which time 1 part of water was added to it. The treated mixture was cooled to room temperature and filtered. The resulting homogeneous product remained stable even after being heated at 125° F. for 3 weeks.

EXAMPLE 2

A stabilizer mixture that contained 5.5% of barium, 3.6% of cadmium, and 2.0% of phosphorus was prepared by mixing together 14.4 parts of barium nonylphenate, 8.2 parts of cadmium 2-ethylhexanoate, 24 parts of diphenyl-n-decyl phosphite, and 53.4 parts of mineral spirits.

This mixture was heated to 150°–160° F. and maintained at that temperature for 60 minutes during which time 0.5 part of water was added to it. The treated mixture was cooled to room temperature and filtered. The resulting product remained homogeneous even after being heated at 120° F. for 3 weeks.

EXAMPLE 3

A stabilizer mixture that contained 5% of barium, 3% of cadmium, 2.5% of phosphorus, and 0.5% of zinc was prepared by mixing together 12.6 parts of barium octylphenate, 3.5 parts of cadmium benzoate, 3.5 parts of cadmium p-tert. butylbenzoate, 28 parts of diphenyl octyl phosphite, 1.6 parts of zinc 2-ethylhexanoate, 8 parts of tripropylene glycol, and 42.8 parts of naphtha.

This mixture was heated to 150°–155° F. and maintained at that temperature for 60 minutes during which time 0.5 part of water was added to it. The resulting homogeneous mixture was cooled to room temperature and filtered.

EXAMPLE 4

A stabilizer mixture that contained 5% of barium, 3% of cadmium, 2.5% of phosphorus, and 2% of zinc was prepared by mixing together 13.1 parts of barium nonylphenate, 3.5 parts of cadmium benzoate, 3.5 parts of cadmium p-tert. butylbenzoate, 3.5 parts of phenyl di-n-decyl phosphite, 6.6 parts of zinc benzoate, 10 parts of tripropylene glycol, and 38.2 parts of naphtha.

This stabilizer mixture was heated to 150°–160° F. and held at that temperature for 90 minutes during which time 1 part of water was added to it. The treated mixture was cooled to room temperature and filtered.

To demonstrate the effectiveness of the water-treated stabilizers in vinyl halide resin compositions, two series of compositions were prepared: in the first series each composition contained as stabilizer one of the untreated stabilizer mixtures whose preparation was described in Examples 1 to 4; each composition in the second series contained as stabilizer one of the aforementioned mixtures which had been treated with water in accordance with the process of the present invention as described in these examples. In each case the vinyl halide resin, plasticizer, epoxidized oil, stearic acid, and stabilizer were blended on a two-roll differential speed mill until a homogeneous blend was obtained. The stabilized compositions were removed from the rolls as milled sheets, 0.045 inch in thickness, and were allowed to cool.

The heat stability of the compositions was determined by placing 1 x 1 inch speciments which had been cut from the milled sheets in forced-circulation air oven at 350° F. and removing specimens periodically until degradation was complete as judged by color change. A color rating scale was adopted for purposes of comparison of color and consequently comparison of stabilizing efficiency. On this scale a rating of 0 denotes absence of color; 2, faint yellow; 3, yellow; 5, orange; and 7, black.

The tendency of the stabilizers to plate-out was measured by preparing by the aforedescribed milling procedure a composition which contained in addition to vinyl halide resin, plasticizer, expoxidized oil, and stabilizer a red pigment that is known to plate out. After milling, the composition was removed from the mill. Then without an intervening cleaning of the mill rolls a white "clean-up" composition was run on the mill. The tendency of the composition to plate out was determined by the degree of coloration of the "clean-up" composition. A numerical scale was used to indicate the plate-out ratings of the compositions. On this scale a rating of 1 denotes no plate-out; 2, light pink coloration; 3, pink coloration; 5, light red coloration; 7, red coloration; and 10, dark red coloration of the "clean-up" composition. For most commercial applications, it is preferred that the compositions have a plate-out rating of 1 to 3.

EXAMPLE 5

Stabilized polyvinyl chloride resin compositions were prepared by the following procedure:

To a mixture of 100 parts of polyvinyl chloride (Geon 101 EP), 45 parts of dioctyl phthalate, 5 parts of epoxidized soybean oil, and 0.5 part of stearic acid was added 3 parts of one of the stabilizers whose preparation is described in Examples 1 to 4. The resulting mixture was blended at room temperature and then charged to a two-roll, steam-heated, differential speed mill whose roll surface temperature was maintained at 330° F. The mixture was milled for 5 minutes and then removed from the rolls as a flexible, homogeneous sheet, 0.045 inch in thickness.

To determine the plate-out characteristics of these stabilizers, other compositions were prepared which contained in addition to the aforementioned ingredients 0.67 part of Permanent Red 2B pigment. The composition was milled for 5 minutes at 330° F. Then without an intervening cleaning of the rolls a 100 part portion of a "clean-up" composition was run on the mill. This composition was prepared from 100 parts of polyvinyl chloride (Geon 101 EP), 30 parts of dioctyl phthalate, 10 parts of calcium carbonate, 1 part of titanium dioxide (rutile), and 0.5 part of calcium stearate.

The properties of the stabilized compositions are given in Table I.

Table I

| Stabilizer | 30 | 60 | 90 | 120 | 150 | Plate-Out Rating |
|---|---|---|---|---|---|---|
| Product of Ex. 1—Untreated | 0 | 0 | 2 | 2 | 3 | 5 |
| Product of Ex. 1—Water-Treated | 0 | 0 | 2 | 2 | 3 | 1 |
| Product of Ex. 2—Untreated | 0 | 0 | 2 | 3 | 3 | 5 |
| Product of Ex. 2—Water-Treated | 0 | 0 | 2 | 2 | 3 | 3 |
| Product of Ex. 3—Untreated | 0 | 0 | 1 | 2 | 3 | 8 |
| Product of Ex. 3—Water-Treated | 0 | 0 | 1 | 2 | 3 | 3 |
| Product of Ex. 4—Untreated | 0 | 0 | 0 | 2 | 2 | 8 |
| Product of Ex. 4—Water-Treated | 0 | 0 | 0 | 2 | 2 | 3 |

EXAMPLE 6

Stabilized polyvinyl chloride resin compositions were prepared by the following procedure:

To a mixture of 100 parts of polyvinyl chloride (Geon 101 EP), 53 parts of dioctyl phthalate, 6 parts of isooctyl epoxy-tallate, 23 parts of calcium carbonate, and 0.4 part of stearic acid was added 2.3 parts of a stabilizer. The mixture was blended at room temperature and then charged to a two-roll, steam-heated, differential speed mill whose roll surface temperature was maintained at 330° F. The mixture was milled for 5 minutes and then removed from the rolls as a flexible sheet, 0.045 inch in thickness.

The properties of the stabilized compositions are given in Table II.

Table II

| Stabilizer | 30 | 60 | 90 | 120 | 150 | Plate-Out Rating |
|---|---|---|---|---|---|---|
| Product of Ex. 1—Untreated | 0 | 0 | 2 | 2 | 3 | 3 |
| Product of Ex. 1—Water-Treated | 0 | 0 | 2 | 2 | 3 | 1 |
| Product of Ex. 3—Untreated | 0 | 0 | 1 | 2 | 2 | 5 |
| Product of Ex. 3—Water-Treated | 0 | 0 | 1 | 2 | 2 | 2 |
| Product of Ex. 4—Untreated | 0 | 0 | 0 | 2 | 3 | 5 |
| Product of Ex. 4—Water-Treated | 0 | 0 | 0 | 2 | 2 | 2 |

EXAMPLE 7

A vinyl halide copolymer resin composition having good heat stability and resistance to plate-out may be prepared by the following procedure:

A stabilizer mixture is prepared by mixing together 15.2 parts of barium n-decylphenate, 8.6 parts of cadmium p-tert. butylbenzoate, 20 parts of triphenylphosphite, and 56.2 parts of mineral spirits and then heating this mixture at 155°–160° F. for 90 minutes while 0.8 part of water is added to it. Then 3 parts of this treated stabilizer mixture is blended using the procedure described in Example 5 with 100 parts of an 80% vinyl chloride-20% vinyl acetate copolymer, 60 parts of di (2-ethylhexyl) phthalate, 5 parts of epoxidized soybean oil, and 0.5 part of stearic acid to form a resin composition which has excellent heat stability and little tendency to plate-out.

The data in Tables I and II clearly demonstrate the high degree of effectiveness of the novel stabilizers in vinyl halide resin compositions. In each case the composition that contained the water-treated stabilizer of the present invention showed excellent heat stability and little or no tendency to plate-out, whereas the comparable composition that contained the untreated stabilizer had equivalent heat stability but had an appreciably greater tendency to plate-out.

The foregoing examples have illustrated the manner in which the water-treated stabilizers may be combined with vinyl halide resins to form compositions that may be used in the preparation of calendered sheets and films. In addition these stabilizers may be used with vinyl halide resins in plastisol, organosol, extrusion, injection molding, and solution formulations to form products that are characterized by good color and clarity, superior heat stability, and excellent resistance to plate-out.

We claim:

1. In the process for the production of stabilizers for vinyl halide resins which comprises forming a mixture comprising (a) an alkaline earth metal salt of a substituted phenol, said substituted phenol having as substituent at least one alkyl group containing from 4 to 12 carbon atoms; (b) a salt of a polyvalent metal selected from the group consisting of cadmium, zinc, tin, zirconium, calcium, and mixtures thereof, and a monocarboxylic acid selected from the group consisting of alkanoic acids containing from 2 to 22 carbon atoms, benzoic acid, alkylbenzoic acids, chlorobenzoic acids, alkoxybenzoic acids, hydroxybenzoic acids, and mixtures thereof; (c) an organic phosphite selected from the group consisting of trialkyl phosphites, triaryl phosphites, dialkyl monoaryl phosphites, and monoalkyl diaryl phosphites; and (d) a hydrocarbon solvent, the improvement which comprises adding to said mixture at a temperature in the range of approximately 110° F. to 190° F. approximately 0.1% to 5.0%, based on the total weight of said metal salts and organic phosphite, of water.

2. The process of claim 1 wherein the alkaline earth metal salt of an alkylphenol is a barium alkylphenate and the polyvalent metal salt of a monocarboxylic acid is a cadmium salt of said acid.

3. The process of claim 2 wherein the organic phosphite is an alkyl aryl phosphite in which each alkyl group contains from 2 to 18 carbon atoms and each aryl group is a member selected from the group consisting of phenyl, hydroxyphenyl, halophenyl, and alkylphenyl groups.

4. In the process for the production of stabilizers for vinyl halide resins which comprises forming a mixture comprising (a) a barium salt of a substituted phenol, said substituted phenol having as substituent at least one alkyl group containing from 4 to 12 carbon atoms; (b) a cadmium salt of a monocarboxylic acid selected from the group consisting of alkanoic acids containing from 2 to 22 carbon atoms, benzoic acid, alkylbenzoic acids, chlorobenzoic acids, alkoxybenzoic acids, hydroxybenzoic acids, and mixtures thereof; (c) an alkyl aryl phosphite wherein each alkyl group contains from 2 to 18 carbon atoms and each aryl group is a member selected from the group consisting of phenyl, hydroxyphenyl, halophenyl, and alkylphenyl groups; and (d) a hydrocarbon solvent, said mixture containing approximately 5%–7% of barium, 3%–5% of cadmium, and 1%–3% of phosphorus, the improvement which comprises adding to said mixture at a temperature in the range of approximately 110° F. to 190° F. approximately 0.2% to 1%, based on the total weight of said barium and cadmium salts and alkyl aryl phosphite, of water.

5. The stabilizer that is the product obtained by forming a mixture comprising (a) 5%–7% of barium as the barium salt of a substituted phenol, said substituted phenol having as substituent an alkyl group containing from 8 to 10 carbon atoms; (b) 3%–5% of cadmium as the cadmium salt of a monocarboxylic acid selected from the group consisting of alkanoic acids containing from 2 to 22 carbon atoms, benzoic acid, alkylbenzoic acids, chlorobenzoic acids, alkoxybenzoic acids, hydroxybenzoic acids, and mixtures thereof; (c) 1%–3% of phosphorus as an alkyl aryl phosphite wherein each alkyl group contains from 2 to 18 carbon atoms and each aryl group is a member selected from the group consisting of phenyl, hydroxyphenyl, halophenyl, and alkylphenyl groups; and (d) 2%–20% of a glycol selected from the group consisting of diethylene glycol, triethylene glycol, tripropylene glycol, and mixtures thereof, and thereafter adding to said mixture at a temperature in the range of 110° F. to 190° F. approximately 0.2% to 1%, based on the total weight of the barium and cadmium salts and alkyl aryl phosphite, of water.

6. The stabilizer that is the product obtained by forming a mixture comprising (a) 5%–7% of barium as barium nonylphenate; (b) 3%–5% of cadmium as a mixture containing substantially equivalent amounts of cadmium benzoate and cadmium tert. butylbenzoate; (c) 1%–3% of phosphorus as a diphenyl monoalkyl phosphite wherein the alkyl group contains from 2 to 18 carbon atoms; and (d) 5%–10% of a glycol selected from the group consisting of diethylene glycol, triethylene glycol, tripropylene glycol, and mixtures thereof and thereafter adding to said mixture at a temperature in the range of approximately 150° to 160° F. approximately 0.2% to 1%, based on the total weight of the barium and cadmium salts and diphenyl alkyl phosphite, of water.

7. The plate-out resistant, heat and light stable composition comprising polyvinyl chloride and from 1 to 4 parts per 100 parts of said polyvinyl chloride of a stabilizer, said stabilizer being the product obtained by forming a mixture comprising (a) 5%–7% of barium as the barium salt of a substituted phenol, said substituted phenol having as substituent an alkyl group containing from 4 to 12 carbon atoms; (b) 3%–5% of cadmium as the cadmium salt of a monocarboxylic acid selected from the group consisting of alkanoic acids containing from 2 to 22 carbon atoms, benzoic acid, alkylbenzoic acids, chlorobenzoic acids, alkoxybenzoic acids, hydroxybenzoic acids, and mixtures thereof; and (c) 1%–3% of phosphorus as an alkyl aryl phosphite wherein each alkyl group contains from 2 to 18 carbon atoms and each aryl group is a member selected from the group consisting of phenyl, hydroxyphenyl, halophenyl, and alkylphenyl groups, and thereafter adding to said mixture at a temperature in the range of 110° F. to 190° F. approximately 0.1% to 5%, based on the total weight of the barium and cadmium salts and alkyl aryl phosphite, of water.

8. The plate-out resistant, heat and light stable composition comprising polyvinyl chloride and from 1 to 4 parts per 100 parts of said polyvinyl chloride of a stabilizer being the product obtained by forming a mixture comprising (a) 5%–7% of barium as the barium salt of a substituted phenol, said substituted phenol having as substituent an alkyl group containing from 8 to 10 carbon atoms; (b) 3%–5% of cadmium as the cadmium salt of a monocarboxylic acid; (c) 0.5%–2% of zinc as the zinc salt of a monocarboxylic acid, the total amount of cadmium and zinc present in said mixture being approximately 3.5%–5% and the monocarboxylic acid in each case being a member selected from the group consisting of alkanoic acids containing from 2 to 22 carbon atoms, benzoic acid, alkylbenzoic acids, chlorobenzoic acids, alkoxybenzoic acids, hydroxybenzoic acids, and mixtures thereof; and (d) 1%–3% of phosphorus as an alkyl aryl phosphite wherein each alkyl group contains from 2 to 18 carbon atoms and each aryl group is a member selected from the group consisting of phenyl, hydroxyphenyl, halophenyl, and alkylphenyl groups, and thereafter adding to said mixture at a temperature in the range of 110° F. to 190° F. approximately 0.2% to 1%, based on the total weight of the barium and cadmium salts and alkyl aryl phosphite, of water.

9. The plate-out resistant, heat and light stable composition comprising polyvinyl chloride and from 1 to 4 parts per 100 parts of said polyvinyl chloride of a stabilizer, said stabilizer being the product obtained by forming a mixture comprising (a) 5%–7% of barium as barium nonylphenate; (b) 3%–5% of cadmium as cadmium 2-ethylhexanoate; and (c) 1%–3% of phosphorus as a phenyl alkyl phosphite wherein the alkyl group contains from 2 to 18 carbon atoms and thereafter adding to said mixture at a temperature in the range of approximately 150° to 160° F. approximately 0.2% to 1%, based on the total weight of said barium and cadmium salts and phenyl alkyl phosphite, of water.

10. The plate-out resistant, heat and light stable composition comprising polyvinyl chloride and from 1 to 4 parts per 100 parts of said polyvinyl chloride of a stabilizer, said stabilizer being the product obtained by forming a mixture comprising (a) 5%–7% of barium as barium nonylphenate; (b) 3%–5% of cadmium as a mixture containing substantially equivalent amounts of cadmium benzoate and cadmium tert. butylbenzoate; (c) 1%–3% of phosphorus as a diphenyl monoalkyl phosphite wherein the alkyl group contains from 2 to 18 carbon atoms; and (d) 5%–10% of a glycol selected from the group consisting of diethylene glycol, triethylene glycol, tripropylene glycol, and mixtures thereof and thereafter adding to said mixture at a temperature in the range of approximately 150° to 160° F. approximately 0.2% to 1%, based on the total weight of said barium and cadmium salts and diphenyl alkyl phosphite, of water.

References Cited by the Examiner

UNITED STATES PATENTS

| | | | |
|---|---|---|---|
| 2,716,092 | 8/55 | Leistner et al. | 260—23 X |
| 2,867,594 | 1/59 | Hansen et al. | 260—23 X |
| 2,935,491 | 5/60 | Mack | 260—23 XR |
| 2,951,052 | 8/60 | Darby | 260—23 |
| 2,953,537 | 9/60 | McBrien | 260—45.7 |
| 2,968,642 | 1/61 | Le Suer | 260—45.75 |
| 2,997,454 | 8/61 | Leistner et al. | 260—45.7 |
| 3,003,998 | 10/61 | Kauder et al. | 260—45.75 |

OTHER REFERENCES

Kirk et al.: "Encyclopedia of Chemical Technology" (1951), vol. 7, page 257 to 262.

Kosolapoff, "Organophosphorus Compounds" (1950), page 188.

LEON J. BERCOVITZ, *Primary Examiner.*

MILTON STERMAN, *Examiner.*